Patented July 7, 1925.

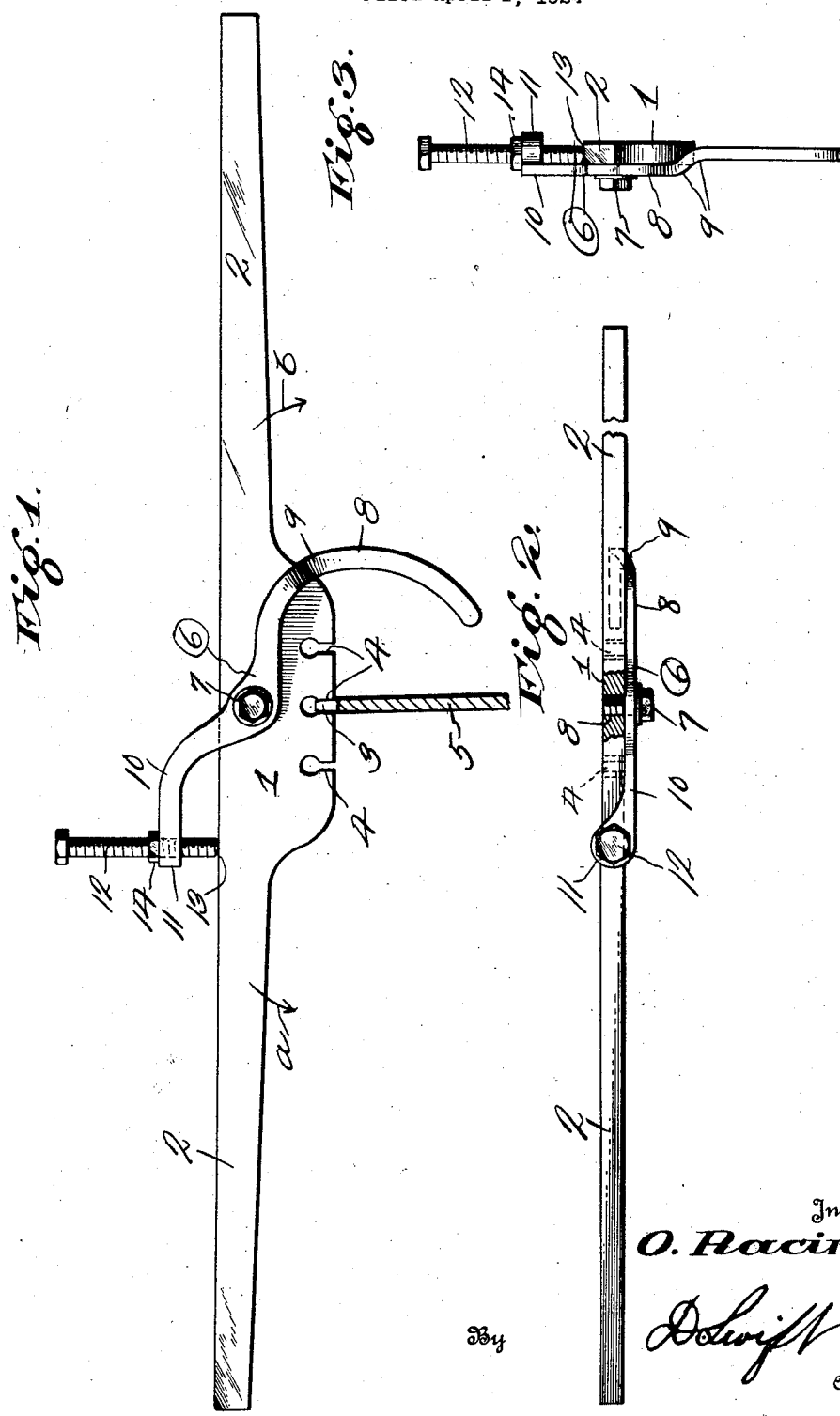

1,545,011

UNITED STATES PATENT OFFICE.

ONESIME RACINE, OF GWINN, MICHIGAN.

SAW SET.

Application filed April 1, 1924. Serial No. 703,469.

*To all whom it may concern:*

Be it known that I, ONESIME RACINE, a citizen of the United States, residing at Gwinn, in the county of Marquette, State of Michigan, have invented a new and useful Saw Set; and I do hereby declare the following to be a full, clear, and exact description of the invention, such as will enable others skilled in the art to which it appertains to make and use the same.

The invention relates to saw sets, and has for its object to provide a device of this character whereby a saw particularly a circular saw may be easily and quickly gaged, and the teeth thereof set accurately, and uniformly.

A further object is to provide a saw set comprising a body member having saw teeth receiving slots therein of various widths for the reception of saw teeth of saws of various gauge and an adjustable stop arm carried by the body member and adapted to engage the side of the saw and limit the tilting movement of the body member during the tooth setting operation, when one of the handle members of the device is raised or depressed, in one direction.

A further object is to pivotally connect the stop arm to said body member, and to provide one of its ends with a lug overlying the upper side of the body member and provided with a set screw cooperating with the body member whereby the saw engaging end of the arm may be adjusted to various positions for limiting the amount of bend to the saw teeth during the operation of the device.

A further object is to curve the saw engaging end of the pivoted arm away from and thence towards the saw, thereby allowing the saw tooth to be easily observed during the tooth setting operation without the arm obstructing the view.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the saw set.

Figure 2 is a top plan view of the saw set, showing a portion broken away to better show the structure.

Figure 3 is an end view of the saw set.

Referring to the drawing, the numeral 1 designates the body of the saw set and 2 oppositely disposed handles carried by the body 1 and formed integral therewith. The handles 2 are adapted to be grasped by the operator for tilting the saw set in the direction of the arrows *a* and *b* according to the direction of set of the saw tooth 3. The lower side of the body 1 is provided with a plurality of gauge slots 4 which are of different widths, and preferably of the widths of standard gauge circular saws commonly used. By referring to Figure 1 it will be seen that the tooth 3 of the saw 5 is disposed in one of the slots 4, and tooth 3 may be bent or set towards either side of the saw, upon a tilting action of the tool as a whole. In saw sets heretofore constructed the amount of set to the teeth is more or less a matter of guess work, and consequently after the saw is set the teeth are not at uniform angles in relation to the circular saw 5. To obviate the above difficulty a stop arm 6 is provided, which arm is pivotally mounted on a set screw 7 threaded at 8 into the body member 1. The stop arm 6 has its downwardly extending arm 8 bent at 9 to underlie the body 1, thereby providing a saw engaging arm disposed in the same plane as the body member 1, and consequently a side twisting or turning of the tool will be prevented during a tooth setting operation when the arm engages the adjacent side of the circular saw 5. It will be noted that the arm 8 curves away from the saw 5 and thence towards the saw, therefore it will be seen that the tooth and the gauge slot 4 in which the tooth is disposed may be clearly observed during the tooth setting operation. The arm 6 is provided with an upwardly extending arm 10, which arm terminates in a portion 11 disposed over the body member 1, and in which portion 11 is threaded an adjusting screw 12, which adjusting screw cooperates with the upper side of the body member 1 at 13 whereby the arm 8 may be adjusted at various distances from the adjacent side of the saw 5 for accurately gauging the amount of set to the saw teeth on successive tooth setting operations. During a saw tooth setting operation alternate teeth are bent to one side of the saw while the other alternate teeth are bent to the opposite side. After the stop arm has been properly adjusted by the set screw 7 and adjusting screw 12 and the lock nut has been tightened on the adjusting screw, and alternate teeth have been bent to one side of the saw, the set is turned around so that the arm 8 thereof is disposed on the opposite side of the saw 5, and at which time the other teeth may be bent towards said last mentioned side, consequently the teeth of the saw will be accurately set to opposite sides of the saw.

From the above it will be seen that a saw set is provided whereby the teeth of a circular saw may be quickly and accurately set, a gauge device is provided for limiting the tilting movement of the saw set upon successive tooth bending operations, thereby insuring a uniform setting of the teeth.

The invention having been set forth what is claimed as new and useful is:—

1. The combination with a saw set having a saw tooth receiving slot therein, of an adjustable stop arm pivotally connected to the side of the saw set and forming means for cooperating with an adjacent side of a saw for limiting the amount of movement of the saw set during a tooth bending operation.

2. The combination with a saw set having a plurality of tooth receiving slots therein, an arm pivoted to one side of said saw set, one end of said arm underlying the underside of the saw set in substantially the same plane as the saw set and adapted to engage the saw and limit the movement of the saw set during a tooth bending operation.

3. The combination with a saw set having a tooth receiving slot therein, a limiting arm pivoted to the side of the saw set, a curved arm carried by said limiting arm and disposed below the saw set in the same plane as the saw set, an arm carried by the limiting arm and overlying the upper side of the saw set and an adjusting screw threaded through said arm overlying the saw set and cooperating with the saw set for adjusting the curved arm in a plane parallel to the saw set and in relation to the side of a saw disposed in the slot.

In testimony whereof I have signed my name to this specification in the presence of two subscribing witnesses.

ONESIME RACINE.

Witnesses:
CLAYTON QUAYLE,
T. H. WILLIAMSON.